June 3, 1930.  L. D. COLLAR  1,761,655
BONNET CONSTRUCTION FOR SELF GRINDING VALVES
Original Filed July 18, 1928
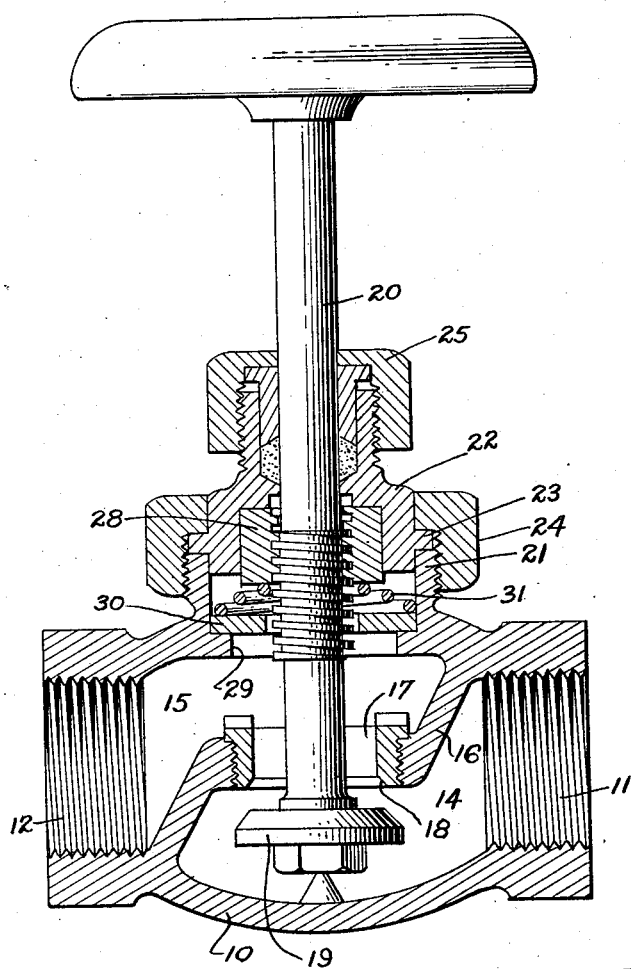
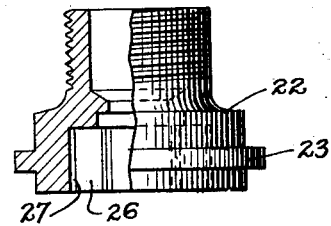
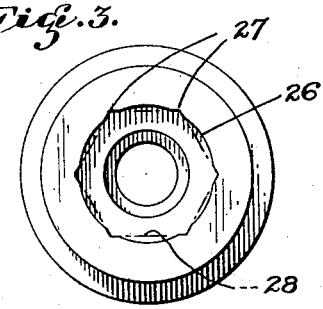
INVENTOR.
Lloyd D. Collar.
BY
Townsend, Loftus & Abbett
ATTORNEYS.

Patented June 3, 1930

1,761,655

UNITED STATES PATENT OFFICE

LLOYD D. COLLAR, OF BERKELEY, CALIFORNIA, ASSIGNOR TO COLLAR VALVE CORPORATION, OF BERKELEY, CALIFORNIA, A CORPORATION OF CALIFORNIA

BONNET CONSTRUCTION FOR SELF-GRINDING VALVES

Application filed July 18, 1928, Serial No. 293,571. Renewed February 25, 1930.

This invention relates to valves of the so-called self-grinding type and particularly pertains to certain improvements on the valve disclosed in Letters Patent of the United States #1,544,219 issued to me June 30, 1925.

The type of valve disclosed in this prior patent includes a valve body having the usual inlet and outlet openings and a valve opening surrounded by a valve seat controlling the flow between the inlet and outlet openings. The valve opening is controlled by a valve which cooperates with the seat. This valve is fitted with a stem which is threaded through a stem block arranged for reciprocating movement but held from turning in a bonnet arranged on the valve body. This stem block bears against a compression spring which is interposed between the stem block and an abutment formed in the valve body. When the valve is moved to closed position the stem threads through the stem block and the latter remains stationary but when the valve abuts against the seat continued rotation of the valve stem causes axial movement of the stem block against the action of the spring, causing the valve to grind on the seat. Also, when commencing to open the valve, the stem of the latter is revolved sufficiently to move the stem block and relieve the spring before the valve commences to leave the seat. This of course, causes a grinding action between the valve and seat prior to opening the valve.

In all of these prior structures the bonnet was formed with a cylindrical counterbore within which the cylindrical stem block reciprocated. As it is necessary that the stem block be held from revolving, keyways were formed both in the stem block and in the bore in which keys were disposed to permit the stem block to reciprocate but prevent it from rotating. Such a construction is an expensive one and it is the principal object of the present invention to improve and simplify this construction to minimize the manufacturing cost of the valve.

In carrying out this object into practice the bore in which the stem block is reciprocable is broached to form six grooves longitudinally thereof of such a disposition that the stem block may be manufactured of standard hexagon stock needing no machine work on its exterior surface and the corners of which will engage the grooves in the bore so that the stem block will be reciprocable but non-rotatable therein.

One form which the invention may assume is exemplified in the following description and illustrated by way of example in the accompanying drawings, in which:

Fig. 1 is a central vertical section through a valve embodying the preferred form of my invention.

Fig. 2 is a view in side elevation of the bonnet partly in section showing its construction.

Fig. 3 is a view of the inner end of the bonnet showing the manner in which the bore thereof is broached to receive a stem block formed of standard hexagon stock.

Fig. 4 is a view in elevation of the stem block.

Referring more particularly to the accompanying drawings, 10 indicates a valve body formed with an inlet opening 11 and an outlet opening 12 which in the present instance are shown in axial alignment. The inlet opening 11 communicates with an inlet chamber 14 and the outlet opening 12 communicates with an outlet chamber 15. These chambers 14 and 15 are separated by a partition 16 having a valve opening 17 formed therethrough. This valve opening 17 is surrounded by a valve seat 18 with which a valve 19 cooperates. This valve 19 is fitted with a stem 20 which extends at right angles to the axis of the inlet and outlet openings 11 and 12 and coaxially through a cylindrical extension 21 formed on the valve body. This cylindrical extension is exteriorly threaded as shown. The bore of this extension 21 is of a diameter capable of snugly receiving the inner end of a bonnet 22. The bonnet 22 is formed with an exteriorly projecting annular flange 23 which is of a diameter slightly less than the exterior diameter of the extension 21, so that it may bear against the outer end of the extension 21 when the bonnet 22 is assembled on the valve body. A bonnet nut 24 is provided which may be arranged over the bonnet to abut against the flange 23 and be threaded on the extension 21 to clamp the bonnet in position.

At its outer end the bonnet 22 is formed with a packing gland structure 25 to prevent leakage around the valve stem. At its inner end the bonnet 22 is counterbored to provide a stem block chamber 26. This stem block chamber after being bored is broached by means of a hexagonal broach to provide six longitudinal grooves 27 spaced equal distances apart. A stem block 28 of hexagonal outline is reciprocably mounted in the stem block chamber 26 with its corners slidably engaging the grooves 27. This arrangement enables the stem block 28 to reciprocate in the chamber 26 but prevents it from rotating.

It should be stated here that the stem block 28 is formed of standard hexagon stock and that its exterior surface need not be machined while manufacturing the valve. For example, should valves be manufactured wherein the stem block is formed of one inch of hexagon stock a bar of this stock is cut into pieces of the desired length which are faced and threaded. The bore or stem block chamber 26 is then broached with a one inch broach which will receive the stem block. This construction enables the bonnet assembly to be inexpensively manufactured when compared with the methods and constructions used hitherto and thus I have minimized the production cost of valves of this type.

At the inner end of the extension 21 it is formed with an inwardly projecting annular shoulder 29 upon which a thrust ring 30 bears. An expansion spring 31 is interposed between the thrust ring 30 and the stem block 28. This type of spring is new in the art and its advantages are fully described and it is claimed in a copending application entitled Valve, filed July 18, 1928, Ser. No. 293,570.

In operation of the valve it is constructed and assembled as shown in the drawings. When the valve stem is rotated it threads upwardly through the stem block until the valve seats on the seat 18. During continued rotation of the valve, the valve 19 revolves on the seat and the stem block 28 is caused to move downwardly against the action of the spring 31 causing the valve to grind on the seat with the pressure of the spring.

In opening the valve, the valve stem is revolved until the stem block 28 reaches its uppermost position and thereafter the valve will comence to open. Thus, the valve will grind on its seat both upon opening and closing the valve.

The principal feature disclosed in this present application, however, is the bonnet construction. This construction as I have previously pointed out minimizes the cost of production of the valve, reduces the number of parts and renders the valve more efficient in operation.

I also wish to point out that in order to disassemble the valve it is only necessary to remove the nut 24, enabling the entire bonnet construction to be removed for packing or replacements.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a valve of the character described, a bonnet construction comprising a bonnet having a stem block chamber formed in the lower end thereof, said chamber being cylindrically bored and then broached to form parallel groves at spaced distances apart, a stem block reciprocably mounted in the bore and of a shape having corners fitting the grooves to permit the stem block to reciprocate in the chamber but to prevent it from rotating.

2. A bonnet construction for a valve of the character described, said bonnet construction including a bonnet adapted to be clamped on a valve body, the inner end of said bonnet being cylindrically bored and then broached to form a cylindrical chamber having six parallel groves at equally spaced distances apart, a stem block formed of hexagonal stock reciprocably mounted in the bore with its corners engaging the grooves to keep the block from revolving in the bonnet.

3. A valve of the character described comprising a valve body, a cylindrical extension on the valve body, a bonnet having its lower end adapted to project within the cylindrical extension, a flange circumscribing the bonnet and adapted to bear on the outer end of said extension, a bonnet nut fitting over the bonnet and bearing against said flange and adapted to be threaded to said extension to clamp the bonnet in position on the valve body, the inner end of said bonnet being cylindrically bored and then broached to receive a hexagonal stem block, a hexagonal stem block reciprocably but non-rotatably fitted within said bore.

LLOYD D. COLLAR.